US008918595B2

(12) United States Patent
Ebsen

(10) Patent No.: US 8,918,595 B2
(45) Date of Patent: Dec. 23, 2014

(54) ENFORCING SYSTEM INTENTIONS DURING MEMORY SCHEDULING

(75) Inventor: David Scott Ebsen, Minnetonka, MN (US)

(73) Assignee: Seagate Technology LLC, Cupertino, CA (US)

(*) Notice: Subject to any disclaimer, the term of this patent is extended or adjusted under 35 U.S.C. 154(b) by 474 days.

(21) Appl. No.: 13/097,011

(22) Filed: Apr. 28, 2011

(65) Prior Publication Data

US 2012/0278530 A1    Nov. 1, 2012

(51) Int. Cl.
*G06F 12/00* (2006.01)
*G06F 12/02* (2006.01)
*G06F 3/06* (2006.01)
*G06F 13/16* (2006.01)

(52) U.S. Cl.
CPC .......... *G06F 3/0659* (2013.01); *G06F 12/0246* (2013.01); *G06F 2212/1016* (2013.01); *G06F 3/0656* (2013.01); *G06F 3/0683* (2013.01); *G06F 3/0614* (2013.01); *G06F 13/1684* (2013.01); *G06F 2212/7205* (2013.01); *G06F 2212/7207* (2013.01); *G06F 13/1673* (2013.01); *G06F 2212/1032* (2013.01); *G06F 3/061* (2013.01)
USPC ............................. 711/151; 711/103; 711/148

(58) Field of Classification Search
CPC .............. G06F 3/0659; G06F 13/1642; G06F 16/1673; G06F 9/4881; G06F 2212/7205; G06F 3/0688; G06F 2212/7207
See application file for complete search history.

(56) References Cited

U.S. PATENT DOCUMENTS

| | | | |
|---|---|---|---|
| 5,555,396 A * | 9/1996 | Alferness et al. ............. 711/147 |
| 5,603,001 A | 2/1997 | Sukegawa et al. |
| 6,157,989 A * | 12/2000 | Collins et al. ................. 711/151 |
| 6,728,826 B2 | 4/2004 | Kaki et al. |
| 7,173,863 B2 | 2/2007 | Conley et al. |
| 8,341,300 B1 * | 12/2012 | Karamcheti et al. .............. 710/6 |
| 2005/0125614 A1 | 6/2005 | Royer, Jr. et al. |
| 2006/0152981 A1 | 7/2006 | Ryu |
| 2009/0006719 A1* | 1/2009 | Traister ......................... 711/103 |
| 2009/0132761 A1* | 5/2009 | Yim et al. ..................... 711/114 |
| 2009/0172263 A1* | 7/2009 | Olbrich et al. ................ 711/103 |
| 2009/0265506 A1* | 10/2009 | Yim ............................... 711/103 |
| 2010/0287333 A1 | 11/2010 | Lee et al. |
| 2010/0293319 A1* | 11/2010 | Lim et al. ...................... 711/103 |
| 2011/0010490 A1* | 1/2011 | Kwon et al. ................... 711/103 |
| 2011/0283049 A1* | 11/2011 | Kang et al. .................... 711/103 |
| 2011/0320722 A1* | 12/2011 | Dunn Berger et al. ........ 711/125 |
| 2012/0173792 A1* | 7/2012 | Lassa et al. .................... 711/103 |

OTHER PUBLICATIONS

Feizabadi, "Automatic Memory Management in Utility Accrual Scheduling Environments", Proceedings of the Ninth IEEE International Symposium on Object and Component-Oriented Real-Time Distributed Computing, 2006, 9 pages.

* cited by examiner

*Primary Examiner* — April Y Blair
*Assistant Examiner* — Michael C Kolb
(74) *Attorney, Agent, or Firm* — Hollingsworth Davis, LLC

(57) ABSTRACT

A memory controller receives memory access requests from a host terminal, the memory access requests from the host terminal including one or both of host read requests and host write requests. The memory controller generates memory access requests. Priorities are assigned to the memory access requests. The memory access requests are segregated to memory unit queues of at least one set of memory unit queues, the set of memory unit queues associated with a memory unit. Each memory access request is sent to the memory unit according to a priority and an assigned memory unit queue of the memory access request.

20 Claims, 15 Drawing Sheets

ENFORCING SYSTEM INTENTIONS DURING MEMORY SCHEDULING

SUMMARY

Various embodiments are generally directed to scheduling memory access requests by a memory controller. The memory controller receives memory access requests from a host terminal, the memory access requests from the host terminal including one or both of host read requests and host write requests. The memory controller generates memory access requests. Priorities are assigned to the memory access requests. The memory access requests are segregated to memory unit queues of at least one set of memory unit queues, the set of memory unit queues associated with a memory unit. Each memory access request is sent to the memory unit according to a priority and an assigned memory unit queue of the memory access request.

Each memory unit queue may be associated with one type of memory access request of several types of memory access requests. The types of memory access requests include at least the memory access requests received from the host as a first type and the memory access requests generated by the controller as a second type. In some cases, each memory unit comprises one or more memory subunits.

In some cases, memory access requests received from the host are assigned a higher priority than memory access requests generated by the memory controller. In some implementations, memory access requests received from the host are assigned a lower priority than memory access requests generated by the controller. In some cases, the priority of memory access requests is dynamic.

In some cases, the memory unit comprises non-volatile memory and the memory access requests generated by the controller include garbage collection requests.

In some cases, the memory access requests generated by the controller include metadata read requests and metadata write requests.

In some cases, sending each memory access request includes determining that an assigned die is idle before sending. In some cases, each memory access request is sent according to a bitmap of idle dies and a bitmap of memory access requests in the die queues.

In some cases, each memory unit comprises multiple memory subunits and each memory unit queue comprises multiple sets of memory subunit queues, wherein each memory subunit queue is respectfully associated with a memory subunit.

Some embodiments involve a method of operating a flash memory controller that schedules memory access requests. The flash memory controller receives memory access requests from a host terminal, the memory access requests from the host terminal may include one or both of host read requests and host write requests. Memory access requests are generated by the flash memory controller. Priorities are assigned to the memory access requests. The memory access requests are segregated to memory die queues of at least one set of memory die queues associated with a memory die. Each memory access request is sent to the memory die according to a priority and an assigned memory die queue of the memory access request.

Some embodiments involve a memory device that includes a host interface, a memory maintenance unit, a scheduler, and a memory interface. The host interface may be configured to receive memory access requests from a host terminal, the memory access requests from the host terminal including one or both of host read requests and host write requests. The memory maintenance unit is configured to generate memory access requests. The scheduler may be configured to enforce a priority to each of the memory access requests and to segregate each of the memory access requests to one of a set of memory unit queues, each set of memory unit queues associated with a channel that allows the memory controller to access a memory device. The memory interface is configured to send each memory access request from the memory controller to the memory device according to its assigned memory unit queue and priority.

In some cases, each memory unit comprises one or more memory subunits. In some implementations, each memory subunit is a flash die. In some cases, each die is associated with a set of die queues.

These and other features and aspects of the various embodiments disclosed herein can be understood in view of the following detailed discussion and the accompanying drawings.

DETAILED DESCRIPTION

Memory devices can use parallelism of memory access requests to increase device performance. Memory device controllers may have to manage a variety of different types of memory access requests which can be prioritized for increased device performance. Memory access can involve queuing different types of memory access requests and imposing a static or dynamic memory access prioritization. In some cases, the priority of a memory access request type depends on where the memory access request originated. For example, a host-originated memory access request may have a higher priority than a controller-originated memory access request at any given time. Various types of memory devices that can implement prioritization of memory access requests include, for example, non-volatile memory, such as flash memory, magnetic memory, and/or hybrid memory devices.

Figure 1A:
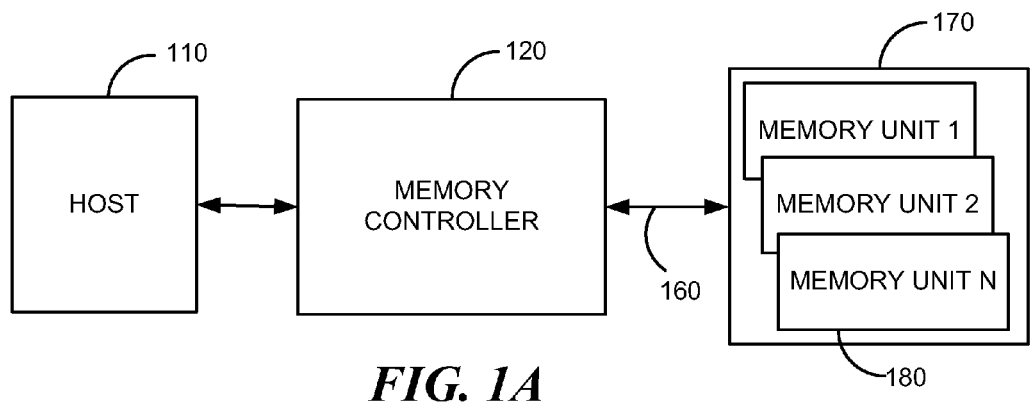
FIGS. 1A and 1B are block diagrams of a system capable of scheduling and prioritizing memory access requests in accordance with some embodiments.
Figure 1B:
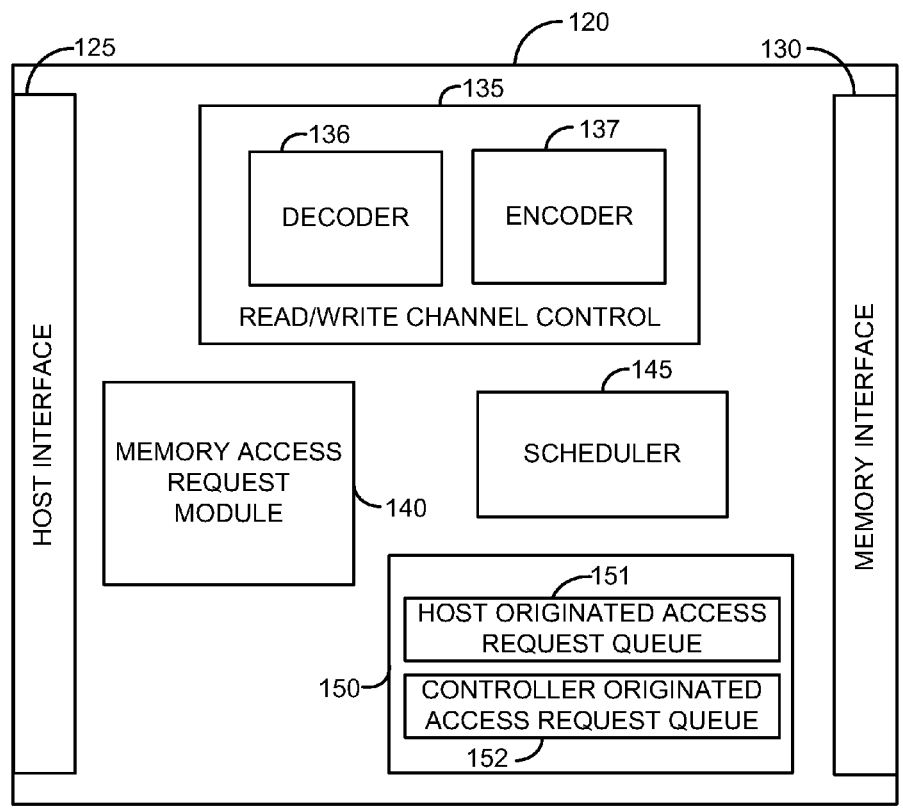

FIGS. 1A and 1B are block diagrams of a system capable of scheduling memory access requests in accordance with embodiments described herein. FIG. 1A includes a memory device 170, a host 110, and a memory controller 120. The memory controller 120 is coupled to the memory device 170 via one or more channels 160. The memory device 170 may correspond, for example, to a solid state, non-volatile memory device. Alternatively the memory device may correspond to a magnetic memory device and/or a hybrid memory device. The memory device 170 may have one or more memory units 180. The host 110 may be any type of computing system. The memory controller 120 provides an interface between the memory device 170 and the host 110.

FIG. 1B illustrates a more detailed block diagram of the memory controller 120. The memory controller 120 includes a host interface 125 for facilitating the transfer of data between the memory controller 120 and the host 110. The memory controller 120 is able to receive memory access requests from the host 110 via the host interface 125. The memory controller 120 may also include a memory interface 130 that allows the memory controller 120 access to the memory device 170 to service memory access requests via the one or more channels 160. A channel is a set of address lines and data lines that selects and accesses a portion of a memory device.

The memory controller 120 may include a read/write channel control unit 135. In some cases, the read/write channel control unit 135 includes an encoder 137 and/or a decoder unit 136. The encoder 137 may encode any data to be stored in the memory device 170 using an error correcting code (ECC). This encoded data can then be stored to the memory device 170 via the memory interface 130 and the one or more channels 160. When data is to be read from memory, the encoded data is read from the memory device 170 and is decoded using the decoder unit 136. The encoded data is decoded using the ECC and transferred to the host 110 using the host interface 125. The encoder 137 and decoder 136 units use the ECC to attempt to correct errors that are present in the data read from the memory device 170. The data errors may arise, for example, due to noise during the read and/or write operations and/or due to data corruption caused by charge leakage and/or erase/program/read disturbs.

Some memory access requests do not originate in the host 110 and instead are generated by the memory controller 120. For example, memory access requests associated with metadata processes and garbage collection processes can be generated in the memory controller 120. As illustrated in FIG. 1B, the memory controller 120 can include one or more memory access request modules 140. For example, a garbage collection control unit may include a memory access request module. In some cases, the controller-originated memory access requests include garbage collection requests and/or metadata requests. Many other types of requests may be generated by the controller.

The memory controller 120 includes a scheduler 145 for scheduling the timing of memory access requests delivered to the memory device 170. The scheduler 145 may route memory access requests to a set of queues 150, e.g. a set of first in first out (FIFO) queues, associated with a memory unit. In some embodiments, the memory controller 120 has a queue for the host-originated access requests 151 and a separate queue for the controller-originated access requests 152. Establishing different queues based on the origination of the memory access requests allows for prioritization between types of memory access requests. The host-originated queue 151 and/or the controller-originated queue 152 may be further subdivided into types of host-originated and/or controller-originated queues. For example, host-originated write requests may be routed to a host write queue and host-originated read requests may be routed to a host read queue. As another example, controller-originated metadata read or write requests may be routed to a controller metadata queue and controller-originated read or write requests related to garbage collection (GC) may be routed to a GC queue.

The scheduler 145 may be used to enforce a priority scheme for the memory access requests. In some cases, host-originated requests may have a different priority than memory controller-originated requests. For example, memory access requests originating from the memory controller 120 may only be serviced after a predetermined number, e.g., about 7, of memory access requests generated by the host 110 have been serviced. In some cases the priority may be dynamic as discussed in more detail below.

Various types of memory access requests associated with a garbage collection process may be generated by the memory controller 120. The need for garbage collection arises because some types of non-volatile memory devices may not be able to directly overwrite changed data, but may need to first perform an erase operation in memory before new data is written. Garbage collection is performed on garbage collection units (GCUs) which may include one or more blocks of data. The erase process for a garbage collection unit first ensures that any valid data currently residing in that GCU is moved to another location, or held in a buffer until this GCU is ready for programming. Once a GCU is erased, that GCU is ready for new data to be written to the GCU.

One goal of garbage collection may be to minimize write amplification. Write amplification generally refers to additional data written to the media device needed to write a particular amount of data from the host. For example, a host may request to write one megabyte of data to a flash media device. In order to fulfill this request, the media device may need to write an additional 100 kilobytes of data through internal garbage collection in order to free storage space needed to fulfill the request. In such a case, the write amplification may be said to be 1.1, e.g., requiring an extra 10% of data to be written. Some types of non-volatile memory such as flash also use over-provisioning, which is impacted by write amplification. Over-provisioning generally refers to utilization of a difference between physical capability of storage of a memory device and the host capacity of the memory device. That is, some types of non-volatile memory devices are physically capable of storing more than the host capacity, or the amount of data that a host computing device is permitted to store in the memory device. These types of memory devices use this extra capacity to shift data among GCUs to avoid constantly erasing the GCUs, e.g., to avoid excessive wear on a subset of GCUs.

Various access requests associated with a metadata process may also be generated by the memory controller 120. Metadata includes information used to facilitate reading from and/or writing to the memory device. Using flash memory devices as an example, metadata can include control information and/or address pointer information. In some implementations, flash metadata can also include the time that a flash memory unit (e.g., erasure block) is written, the reference voltages used to read the memory, and/or a bitmap indicating the error rate of the memory cells. Other types of metadata can be used for flash systems and/or other types of memory systems. The memory controller generates memory access requests to read and/or store metadata in the memory device 170.

Figure 2A:
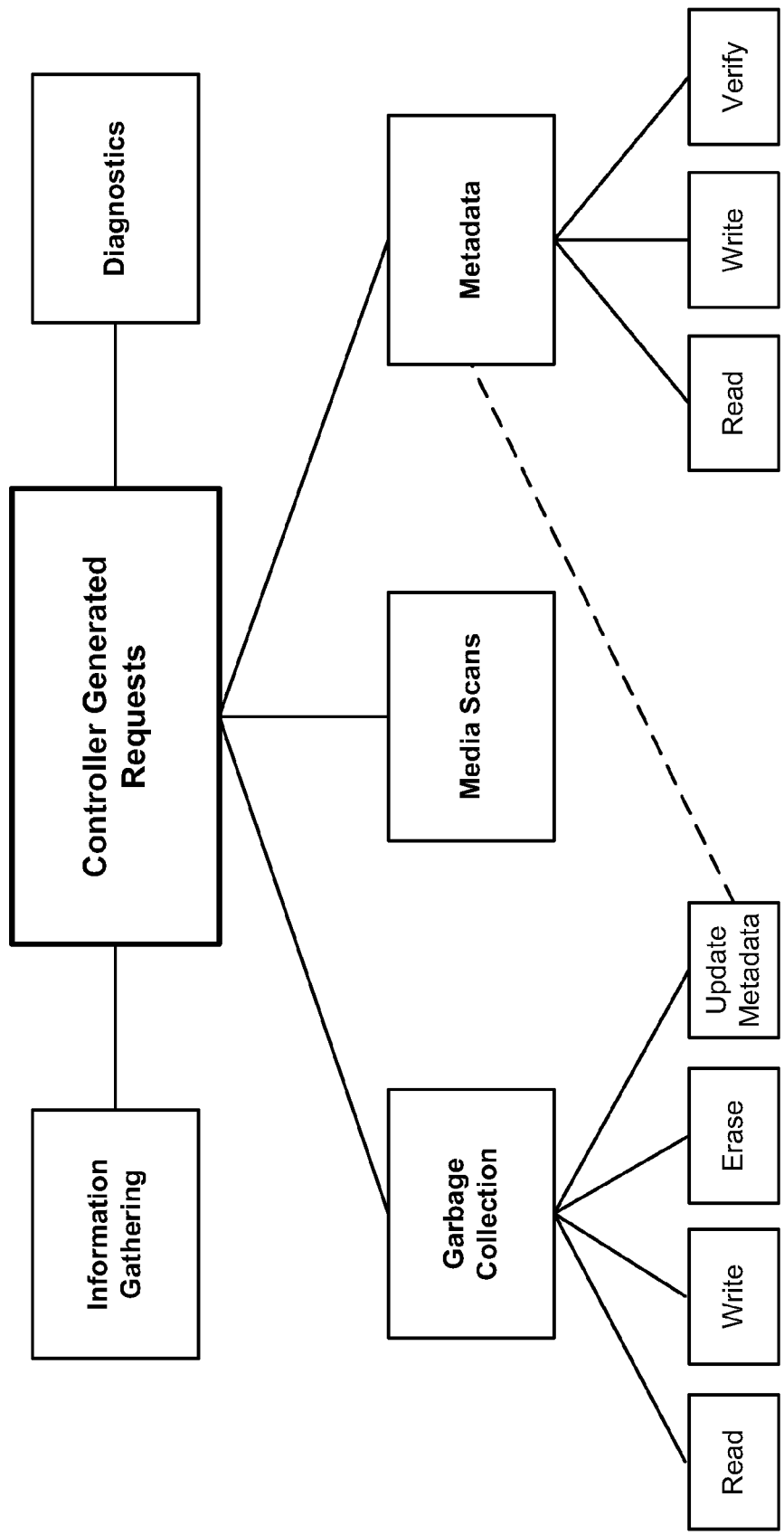
FIG. 2A illustrates different types of memory access requests that may be generated by the controller in accordance with various embodiments.
Figure 2B:
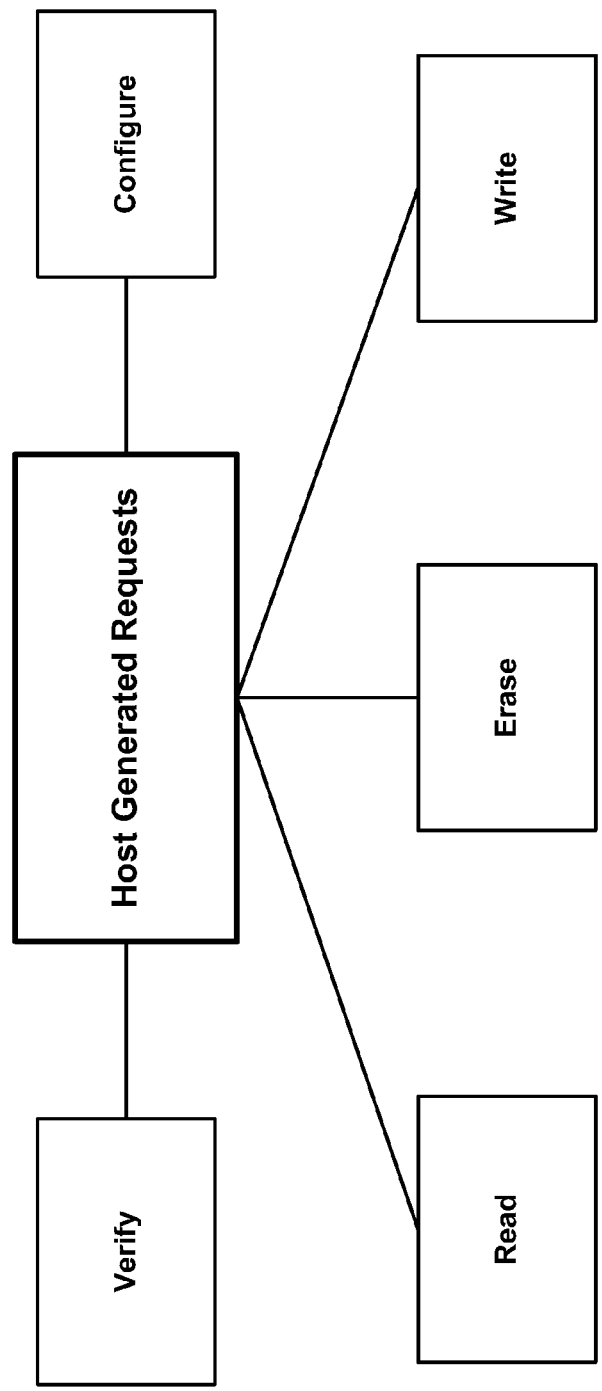
FIG. 2B shows different types of memory access requests that may be generated by the host in accordance with embodiments described herein.

FIGS. 2A and 2B illustrate a hierarchy of types of memory access requests. FIG. 2A shows memory access requests that may be generated by the controller. For example, as shown in FIG. 2A, garbage collection requests are generated by the controller. To service a garbage collection request, other types of requests may have to be serviced. As can be seen from FIG. 2A, servicing a garbage collection request may include, for example, a read request, a write request, an erase request, and/or a request to update metadata. If a metadata request is received, such as in response to a garbage collection request, a read request, a write request, and a verify request may be serviced in response to the metadata request. Controller-originated requests may also include other types of requests. Other controller-originated types of requests may include media scans to check the integrity of the media, diagnostic requests, and other information gathering requests.

FIG. 2B is a diagram illustrating types of host-generated requests. As shown in FIG. 2B, host-originated requests may include various types of requests, such as read, write, erase, verify, and configure requests. Verify requests may be used to determine if the bit error rate (BER) of a memory subunit is above a threshold value, for example. A verify request may also be used to ensure convergence of the data. Configure requests can be requests to set a BER threshold for the data, for example.

Figure 3:
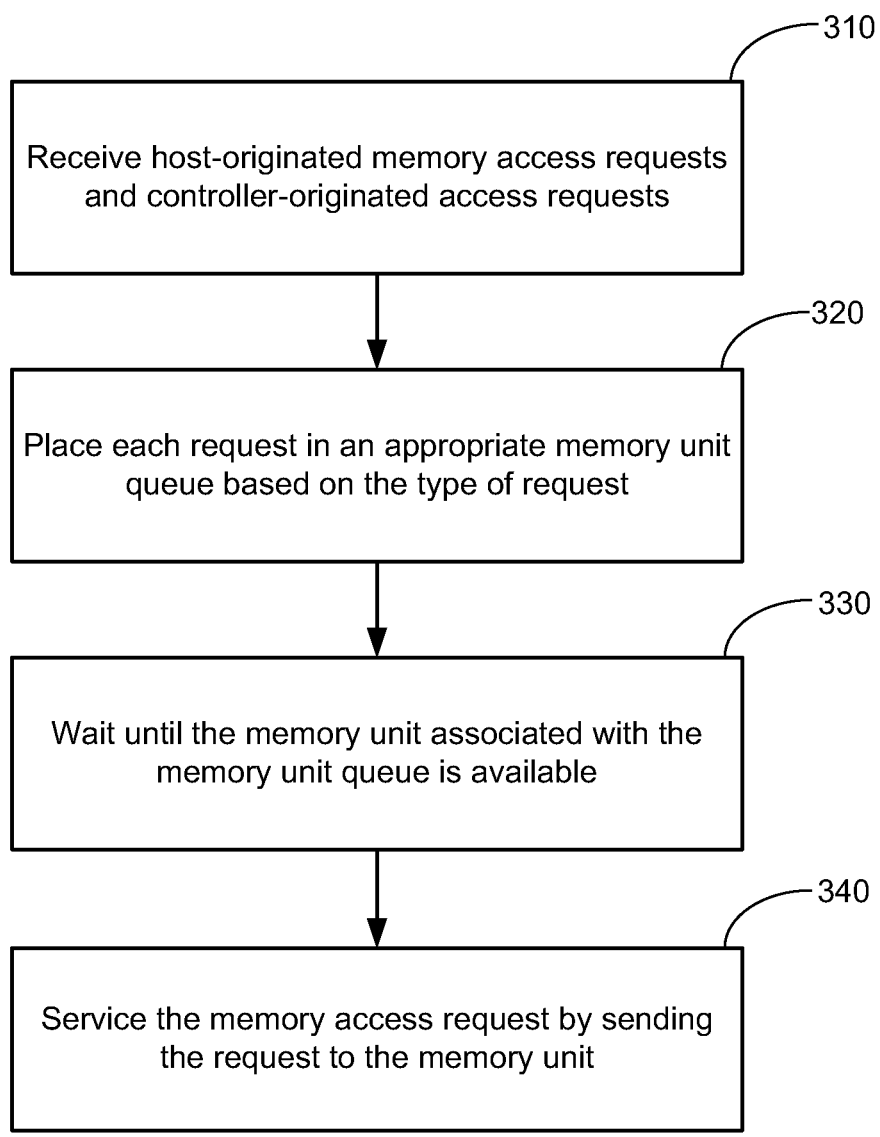
FIG. 3 is a flow diagram that illustrates a process for scheduling memory access requests in accordance with some implementations.

FIG. 3 is a flow diagram that illustrates a process for scheduling memory access requests. According to this process, the scheduler receives 310 host-originated memory access requests and controller-originated access requests. Each request originated in the host or in the controller is processed by the scheduler. The scheduler places 320 each request in an appropriate memory unit queue based on the type of request. The process may place a request in a particular queue based on where the request originated. For example, the scheduler may place all host-originated requests in one queue and all memory controller-originated requests in a different queue. In some cases there may be more than two queues. For example, the host-originated requests may be further broken down into host read requests and host write requests that have separate queues associated with them. The memory controller-originated requests may be broken down into garbage collection requests and metadata requests that are each associated with their own queue. In some cases, each type of request is associated with a different priority. For example, the host-originated read requests may have a higher priority than the memory controller-originated garbage collection requests and/or may have a higher priority than the host-originated write requests.

When a memory access request in a queue arrives at the head of the queue, i.e., it is the next request to be serviced according to the queue position and the priority of that type of request, the process waits 330 until the memory unit is available. The process may also check for conflicts with outstanding memory access requests on that channel and/or memory unit before servicing the request. Once the process determines that the memory unit is available, the memory access request is serviced 340 by sending the request to the memory device via the channel.

Figure 4A:
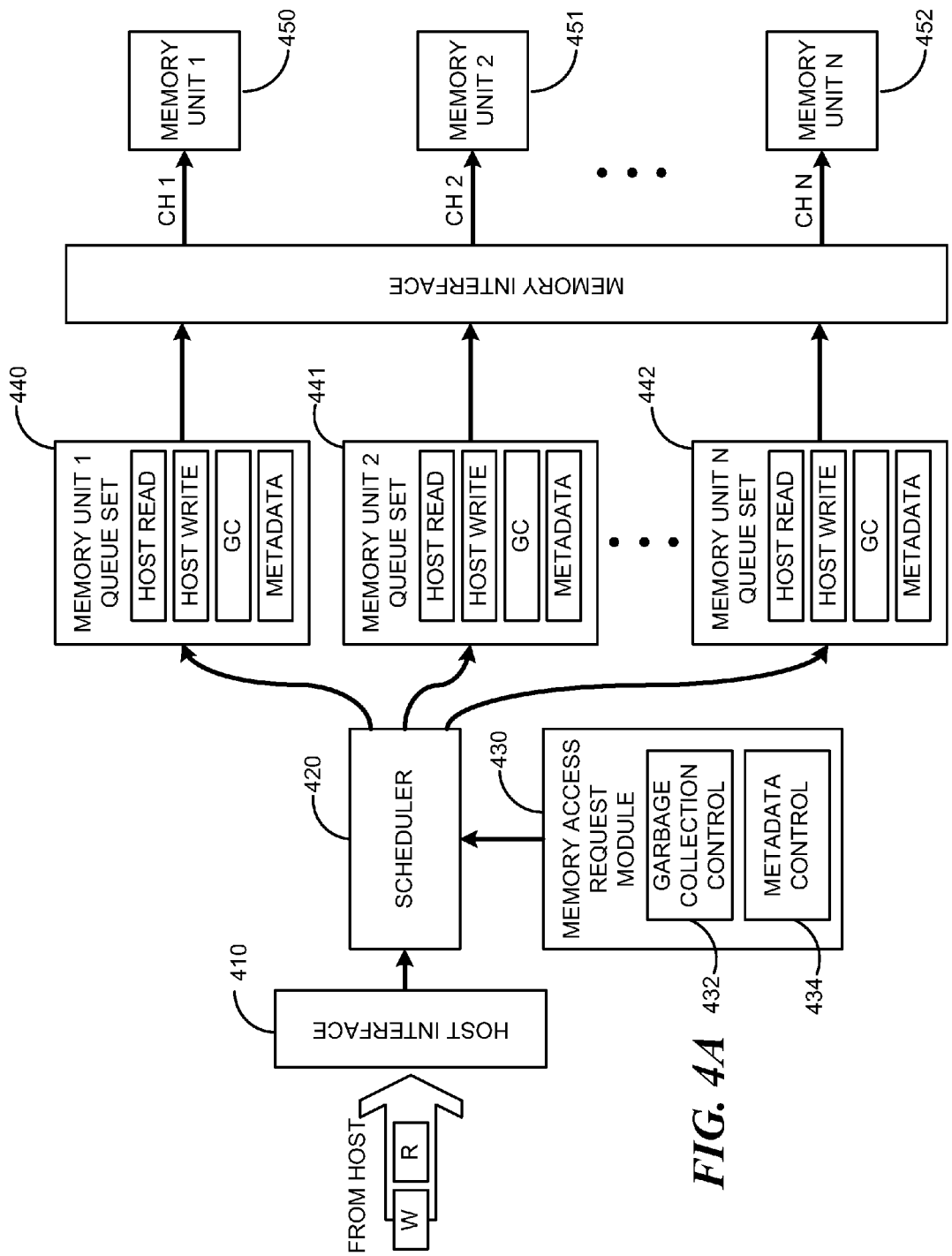
FIG. 4A illustrates a block diagram of a portion of the memory controller involved in prioritizing and servicing memory access requests in accordance with some embodiments.

FIG. 4A illustrates a more detailed block diagram of a portion of the memory controller involved in prioritizing and servicing memory access requests. According to FIG. 4A, the scheduler 420 receives memory access requests from the host via the host interface 410. In this example, the memory access requests received from the host include host write requests (W) and host read requests (R). The scheduler 420 also receives memory access requests that originate in the controller from a memory access request module 430. The host-originated requests and the controller-originated requests are assigned to a memory unit queue set 440, 441, 442. In the case illustrated in FIG. 4A, there are N memory unit queue sets, one for each memory unit in the memory device. According to FIG. 4A, each memory unit queue set 440, 441, 442 comprises four queues including a host read queue, a host write queue, a garbage collection queue, and a metadata queue.

Once a request is assigned to a set of memory unit queues 440, 441, 442, the request may then be assigned to a queue within the memory unit queue set 440, 441, 442 based on the type of request. In the example of FIG. 4A, there are four memory unit queues within each memory unit queue set 440, 441, 442, e.g., a host read queue, a host write queue, a garbage collection queue, and a metadata queue. Each of the queues utilizes a first in first out (FIFO) data structure. In some cases, the order that the requests are serviced is based on a priority scheme associated with the type of memory access request. In some implementations, the first request that is assigned to a memory unit queue set 440, 441, 442 is the first request to be serviced. This scenario would occur, for example, if each request in the memory unit queue set had the same priority. In some implementations, a priority scheme is based on ratios between queues of a queue set 440, 441, 442, e.g. a garbage collection queue:host queue ratio may be 1:7 or some other ratio. For the example of a 1:7 prioritization ratio, each garbage collection request is serviced after 7 host originating requests are serviced. A priority scheme may also be present between different types of host originating requests and/or different types of memory controller originating requests. For example, a host write may only be serviced after three host reads have been serviced corresponding to a host write:host read ratio of 1:3.

Figure 4B:
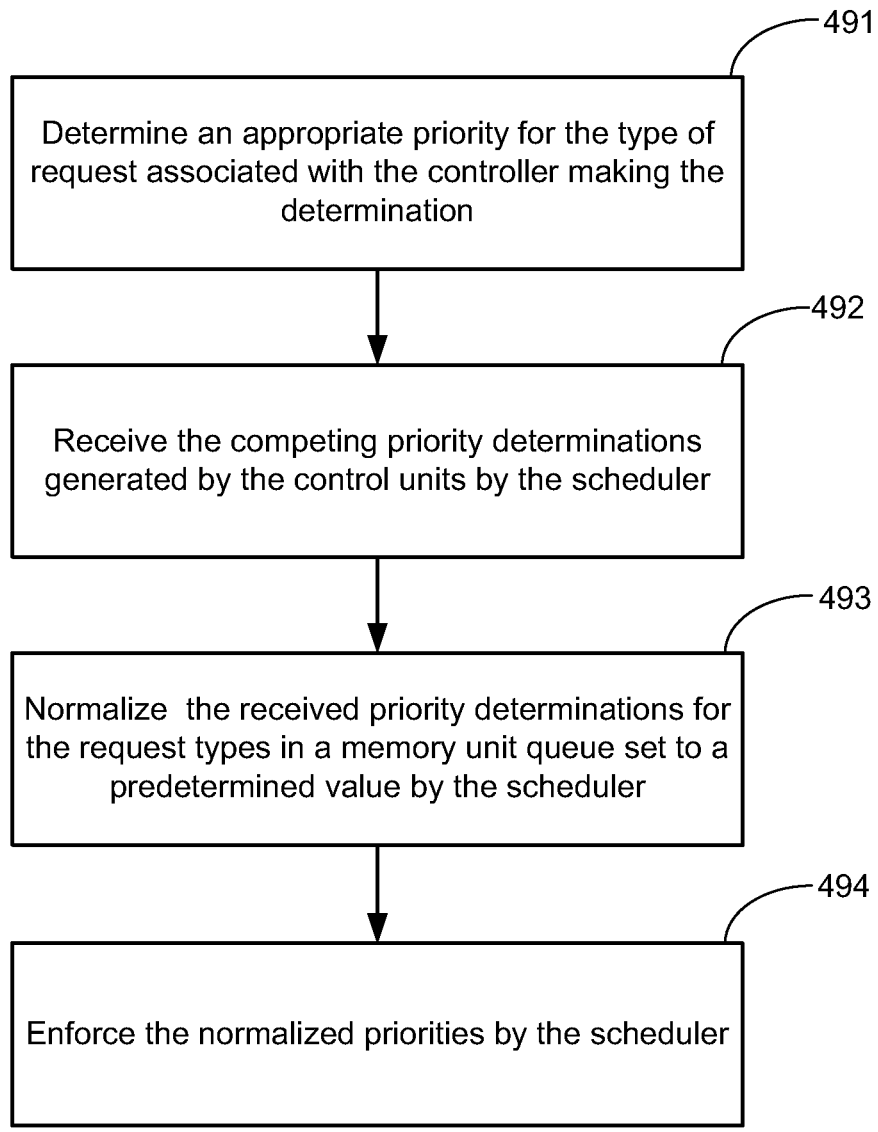
FIG. 4B is a flow diagram that illustrates a process for prioritizing memory access requests in accordance with various embodiments described herein.

Turning now to the flow diagram of FIG. 4B, in some configurations that include distributed prioritization, the system may include multiple request control units that compete for priority for the type of requests respectively associated with the control units, e.g., host read, host write, garbage collection. The control unit for a request type determines 491 an appropriate priority value for the type of request associated with that particular request unit controller. The appropriate priority value determined by a request unit controller can be based on the current need for the particular request. For example, the garbage collection request control unit 432 may determine that garbage collection is needed and may request a higher priority value for garbage collection related requests. The scheduler receives 492 the competing priority determinations generated by the request control units. In some cases, the scheduler will normalize 493 the received priority determinations for the request types in a memory unit queue set to a predetermined value, for example, 32 or some other value. The scheduler may also enforce 494 the normalized priorities.

In some implementations that involve centralized prioritization, the scheduler determines priority values for each of the request types. In some cases, the priority of a request type may be static, i.e. the same at all times. In some implementations, the priority scheme may be dynamic, changing based on the load of incoming requests. In some cases, the priority scheme can also change due to dependencies that may exist between various types of memory access requests. For example, garbage collection requests may receive a higher priority to accommodate a large number of write requests.

Each queue may also have a token value associated with it. Referring to the previous example, in some cases, garbage collection requests are serviced after 7 host-originated requests are serviced. In this example, each queue receives a number of tokens based on the priority of the queue for a particular request type. In the example in which 7 host-originated requests are serviced for every 1 garbage collection requests, the host-originated request queue will receive 7 tokens and the garbage collection request queue will receive 1 token. The scheduler determines the next request to be serviced based on the number of tokens associated with each queue in the queue set. In this example, the scheduler determines which queue in a queue set has the highest number of tokens and the request at the head of that queue is the first to be serviced. After the request has been serviced, the number of tokens for that queue is decremented. In this case, the host-originated request queue started at 7 tokens and after the first request was serviced, the number of tokens for that queue is decremented to 6. The scheduler continues to service requests based on the number of tokens associated with each queue in the queue set.

In cases in which two of the queues have the same number of tokens, various methods can be used to determine which queue in the queue set will have the next request to be serviced. For example, the scheduler may select to service a request in the queue that most recently had a serviced request. In another scenario the scheduler may service a request in the queue that least recently had a serviced request. In some implementations, the scheduler may select a queue for service based on an associated resource cost of the types of requests in the queue, e.g., the scheduler may select the queue associated with a request type that requires the lesser or least amount of resources before selecting a queue associated with a request time that requires more resources. In another example, the scheduler may service an older or oldest request that is at the head of one of the tied queues. The scheduler may also determine to service a request in a queue based on the stored priority scheme of the request types, e.g., the request type with the highest priority may be selected to be serviced first in the event of a token tie.

In the event that all tokens in a queue set are decremented to zero, the scheduler may replenish the tokens. In some cases, the number of tokens that are replenished for each queue in the queue set depends on the last saved priority scheme. In other cases, the scheduler and/or request control units determine a new priority scheme based on the current system load, for example. In this case, the tokens are then replenished according to the new priority scheme.

In some cases, the scheduler will monitor the head of each queue to determine if stalling exists. Stalling exists when a request has been at the head of a queue for over a predetermined period of time. In response to a positive determination that the request has been at the head of a queue for greater than a predetermined period of time, the scheduler aborts the stalled request and will re-issue the request. In some cases the scheduler may increase the priority of the type of request that is associated with the stalled request.

In some cases, the priority scheme may change depending on various factors. For example, host-originated requests may be given a lower priority than requests associated with a garbage collection process when there is a small number of host-originated requests being sent to the scheduler in comparison to the number of controller-originated requests. In some implementations, host-originated requests are given a higher priority than controller-originated requests. In another example, a request that has been waiting for a predetermined amount of time to be serviced may have its priority increased in order to facilitate more immediate scheduling.

In some embodiments presented in this disclosure, the priority of garbage collection may increase based on a determination that there are less than a threshold number of erased garbage collection units (GCUs) available. For example, host writes may have a higher priority than garbage collection requests, but if the garbage collection controller determines that the number of erased garbage collection units drops below a threshold, then the garbage collection controller may request a higher priority for the garbage collection that may exceed the priority of host writes.

The garbage collection process comprises multiple steps as exemplified by the example. A first step involves selecting a GCU to erase. A next step involves determining which pages inside the GCU have valid data. Once identified, the valid data is read and re-written to a new location. Finally, the GCU is erased.

Memory requests used to perform garbage collection generally take place at some rate greater than host input/output memory requests. If this were not the case, host traffic would stall until garbage collection was complete. If host traffic is non-uniform, then the demand for erased GCUs will change over time. The amount of erased GCUs kept in reserve directly subtracts from over-provisioning in the memory device. The amount of over-provisioning available to hold data affects write amplification in an exponential relationship. Losing any over-provisioning space comes at a cost to the lifetime of the memory device. Therefore, there is a balance needed between a rate at which garbage collection is carried out and actual demand from host input/output.

The following description relates to garbage collecting memory blocks using a "just in time" scheme. This approach monitors a demand for erased memory blocks and dynamically adjusts a rate and system priority of garbage collection requests. The effect is a smooth blend of garbage collection and host input/output, which can better accommodate changes in host traffic. Under this technique, host traffic will not "stall" waiting for erased GCUs. This method also has a minimal impact to system over-provisioning space since it maintains "just enough" erased GCUs to meet host demand. In some distributed embodiments for the just in time garbage collection process, the priority of garbage collection related requests may be determined by garbage collection request controller. In some centralized embodiments, the scheduler determines the priority for garbage collection.

In a some embodiments, a memory includes multiple garbage collection units. The memory also includes a garbage collection controller that determines whether to select a garbage collection unit of the multiple garbage collection units for garbage collection based on a variable threshold number of the multiple garbage collection units to garbage collect.

In some embodiments, a method is disclosed that includes providing multiple garbage collection units, and establishing a variable threshold number of the multiple garbage collection units to garbage collect. The method also includes determining whether to select a garbage collection unit of the multiple garbage collection units for garbage collection based on the variable threshold number of the multiple garbage collection units to garbage collect.

In still another embodiment, a memory is disclosed that includes multiple garbage collection units. The memory also includes a controller that determines whether to select a garbage collection unit of the multiple garbage collection units for garbage collection based on three different threshold numbers of the multiple garbage collection units to garbage collect.

The system may include a garbage collection control unit that helps implement just in time garbage collection within a memory device. In some embodiments, the garbage collection control unit determines whether to select a GCU of the multiple garbage collection units for garbage collection based on a variable threshold number of the multiple garbage collection units to garbage collect.

A GCU may be a single physical block or may constitute more than one physical block. From a garbage collection standpoint, memory may be viewed as including multiple GCUs that are coupled to the garbage collection control unit. In one embodiment, the multiple GCUs are divided into different subsets or usage groups based on nature of usage. For example, assignment of GCUs to different usage groups may be based on how frequently different GCUs are updated by a host. Thus, a first subset of GCUs may have host update frequencies that are within a first range of host update frequencies that define a first usage group. Similarly a second subset of GCUs may have host update frequencies that are within a second range of host update frequencies that define a second usage group. In general, any suitable criteria may be used to define usage groups. Also, as will be described below, under certain conditions, a GCU may be reassigned to a different usage group.

In some embodiments, to carry out just in time garbage collection, garbage collection control unit employs a fixed minimum number, a variable maximum number, and a fixed maximum number of erased GCUs for each usage group. A task (computer program) executed by garbage collection control unit monitors erased GCU usage by usage group and schedules garbage collection requests using the memory request priority scheme as discussed herein. The task filters the demand for write ready GCUs for each usage group (by using an exponentially smoothing filter, for example) and uses that information to determine a priority of garbage collection requests being submitted.

Figure 5A:
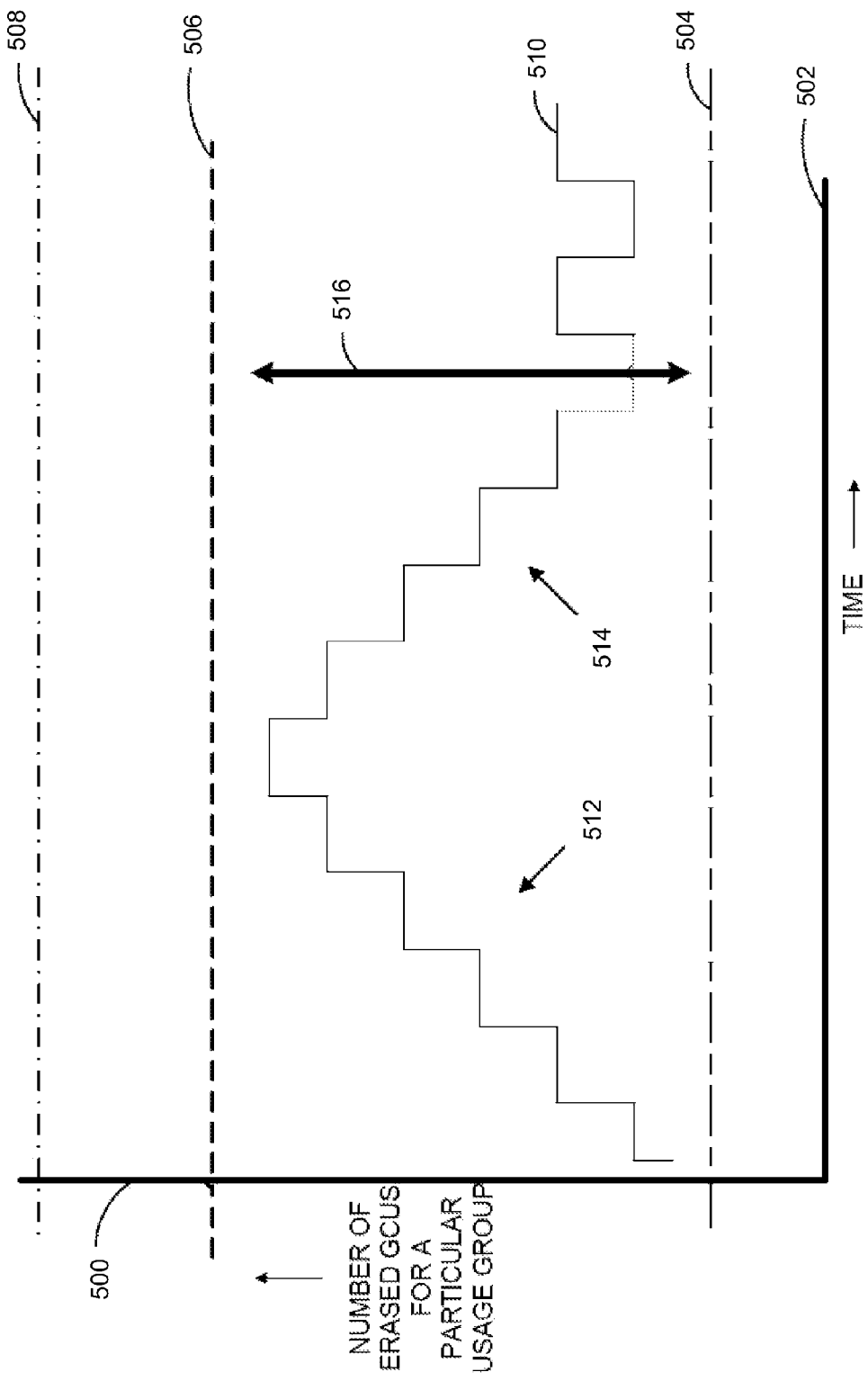
FIGS. 5A through 5C are plots showing different aspects of one illustrative just in time garbage collection embodiment in accordance with various embodiments.
Figure 5B:
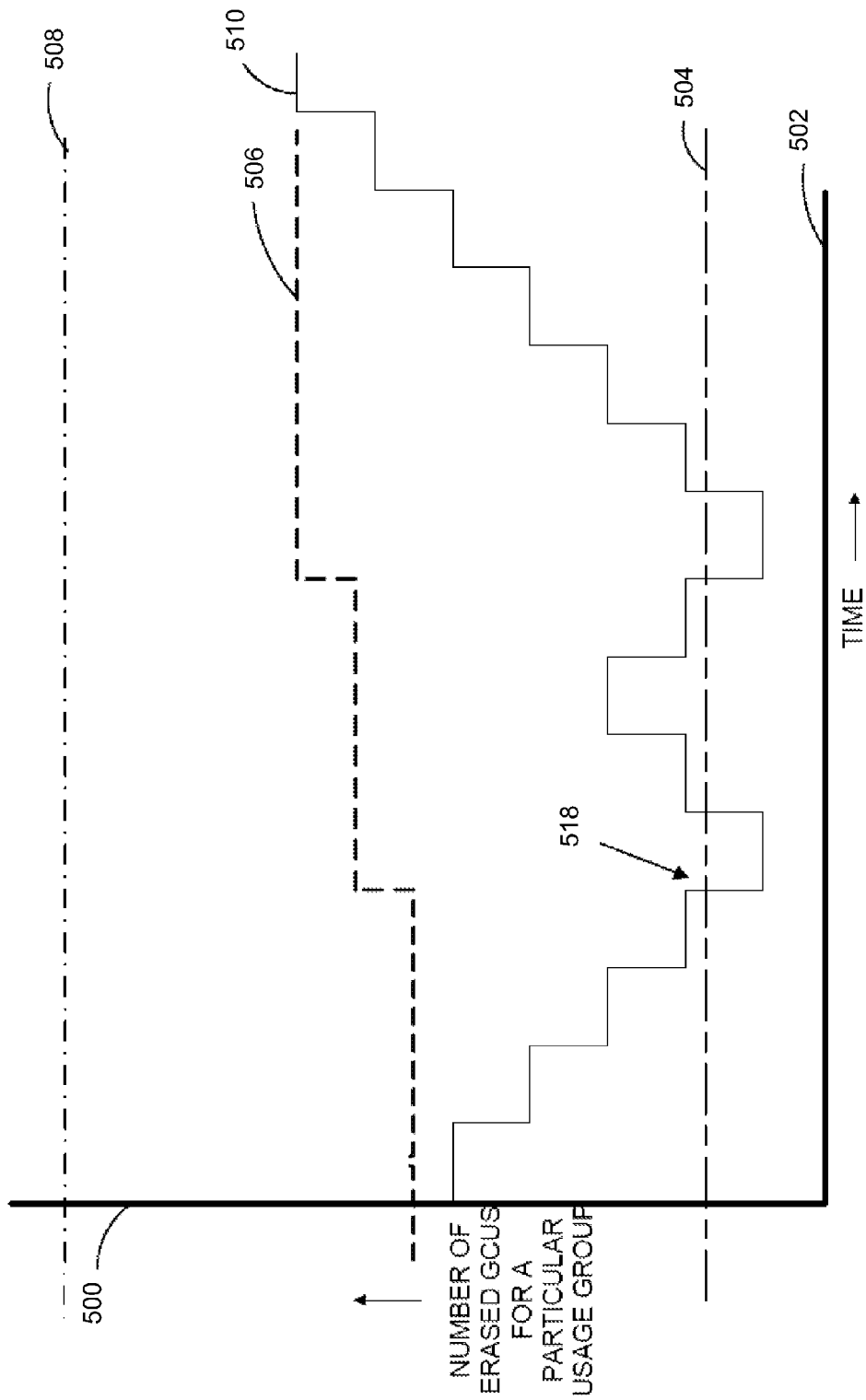
Figure 5C:
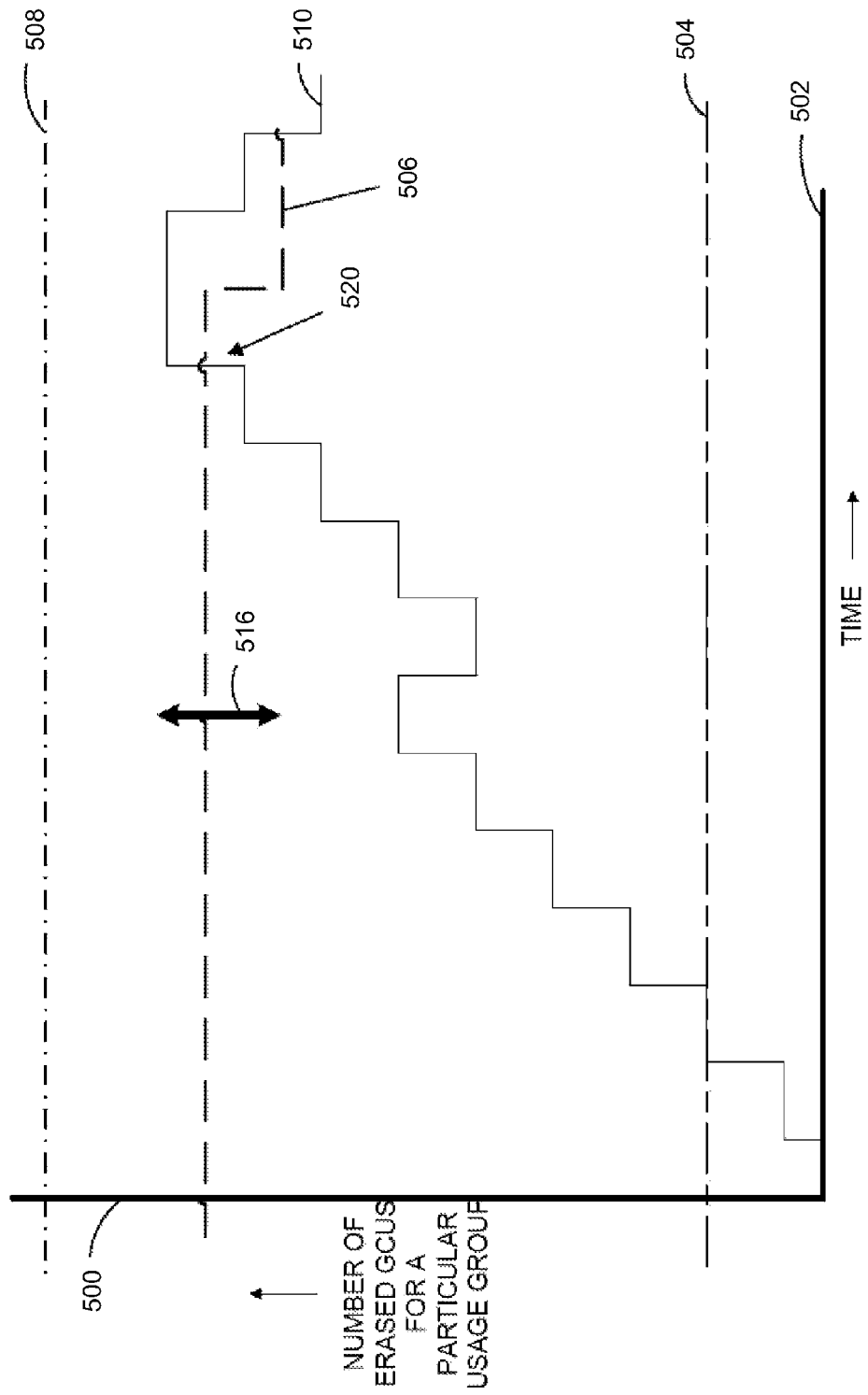

As can be seen in FIG. 5A, vertical axis 500 represents a number of erased GCUs for a particular usage group and horizontal axis 502 is a time axis. In FIG. 5A, horizontal line 504 is a fixed minimum number or threshold of erased GCUs for a particular usage group. Horizontal line 506 is a variable maximum number or threshold of erased GCUs for the particular usage group, and horizontal line 508 is a fixed maximum number or threshold of erased GCUs for the particular usage group. Plot 510 illustrates a variation in a number of erased GCUs for a particular usage group over time. Region 512 of plot 510 shows a build up in a number of erased GCUs over time and region 514 of plot 510 shows a draw down in the number of erased GCUs as a result of host input/output functions consuming erased GCUs. Vertical line 516 illustrates a correlation between demand for GCUs and garbage collection priority. A number of erased GCUs approaching an upper end of line 516 may be an indication of a decreased demand for erased GCUs in the particular usage group. This results in GCUs in the particular usage group being assigned a lower garbage collection priority than GCUs belonging to usage groups in which there is a relatively greater demand for GCUs. A number of erased GCUs approaching a lower end of line 516 is an indication of an increased demand for erased GCUs in the particular usage group, which results in a corresponding assignment of a higher garbage collection priority for the GCUs for that group. In spite of the GCUs being assigned a higher garbage collection priority, if the particular usage group is continually running out of GCUs, then the variable maximum number of ready GCUs 506 for the usage group is increased. This is shown in FIG. 5B, which illustrates this scenario by showing variable maximum threshold 506 moved higher in response to the erased GCU count passing the fixed minimum threshold 504 at region 518. It should be noted that, in some embodiments, any non-used erased GCUs may be reallocated to a different usage group if not consumed by host traffic in a predetermined amount of time. If the particular usage group is, on average, not using its erased GCUs, then the variable maximum threshold 506 is decreased. FIG. 5C illustrates this scenario by showing that the variable maximum threshold 506 is decreased in response to the erased GCU count passing the variable maximum threshold 506 at region 520. In such embodiments, the variable maximum threshold adjusts according to GCU usage as not to take away from over-provisioning space unnecessarily. Having a queue of ready erased GCUs per usage group, with the number of erased GCUs tailored specifically to the host's trended demand, prevents reducing host traffic until garbage collection is completed to hold the new data. In some embodiments, the priority of garbage collection is increased when the number of GCUs drops below or comes within a certain distance of the minimum threshold. In some implementations, the priority for garbage collection requests is reduced if the number of erased GCUs rises above or comes within a distance of the variable maximum threshold and/or the fixed maximum threshold.

Figure 6:
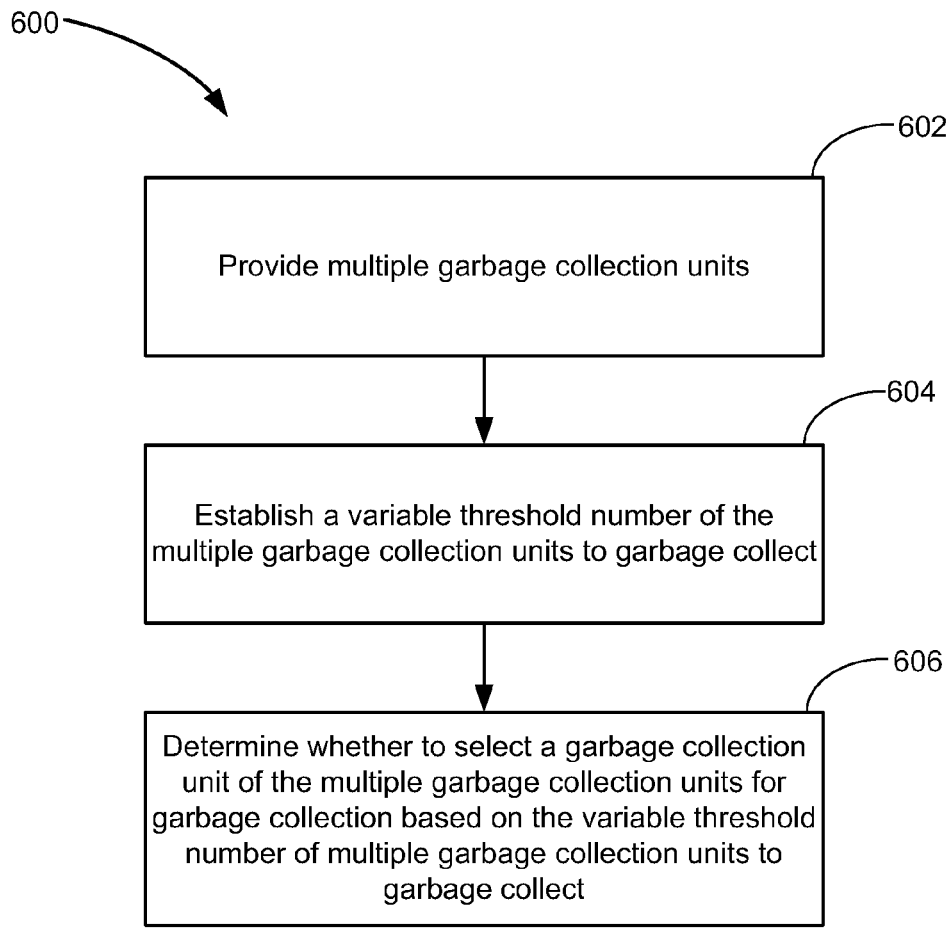
FIG. 6 is a flow diagram of an embodiment of a garbage collection method in accordance with some embodiments.

Referring to FIG. 6, a flow diagram of a method of memory management is shown and generally designated 600. The method 600 may be implemented via the garbage collection control unit. The method 600 may include providing multiple garbage collection units, at 602. The method may then include establishing a variable threshold number of the multiple garbage collection units to garbage collect, at 604. The method may also include determining whether to select a garbage collection unit of the multiple garbage collection units for garbage collection based on the variable threshold number of the multiple garbage collection units to garbage collect, at 606.

In some cases, a priority of a request type is at least partially determined based on a calculated cost of the request which is related to the amount of resources required by the type of request. In the example in which each request type has a controller that requests certain priority values, the scheduler or other system module may adjust the requested priority values based on a calculated cost of that type of request. For example, an erase requires more time and resources than a read. Therefore, erase requests may have a higher cost value associated with them than a read request. The cost value may be used to adjust the priority value of that type of request.

Figure 7:
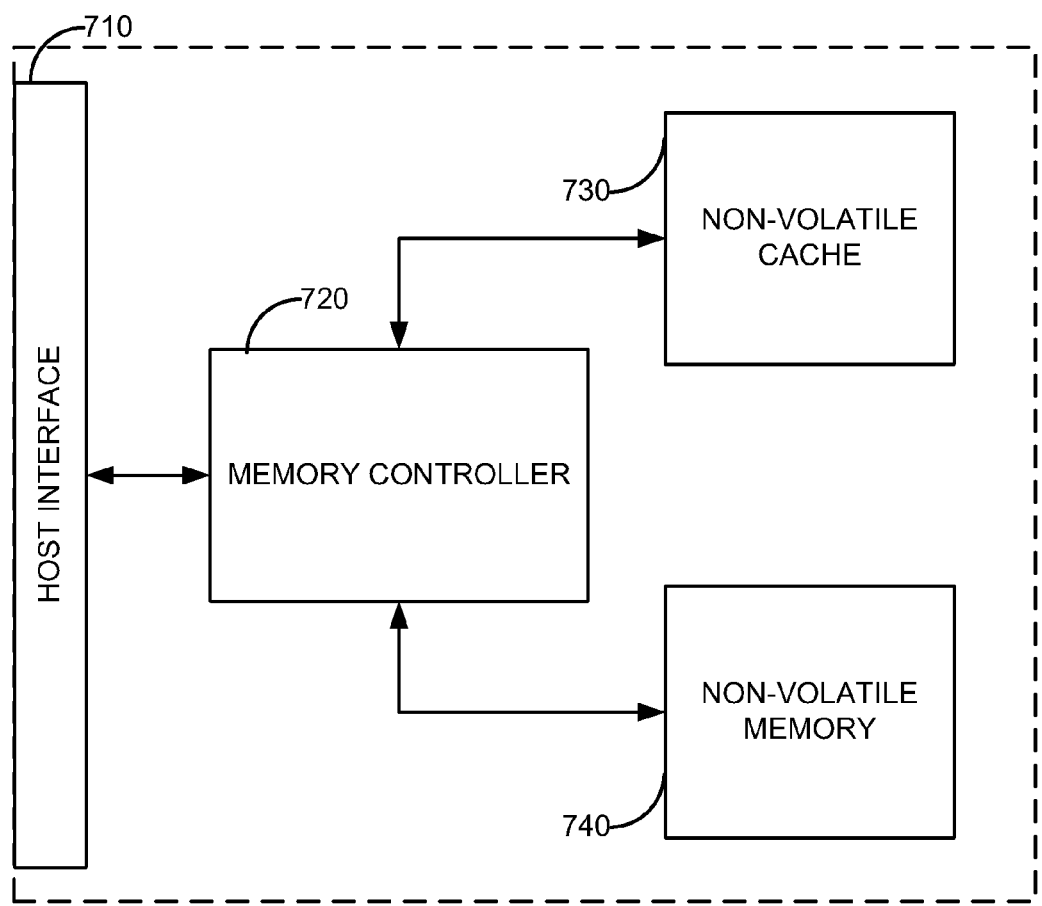
FIG. 7 is a block diagram of a memory system that includes a non-volatile cache and non-volatile memory in accordance with embodiments described herein.

FIG. 7 is a system diagram of a memory system that includes a non-volatile cache 730 and non-volatile memory 740. The non-volatile cache may allow for faster access to some data. For example, the cache may allow for quicker access to recently used data and/or frequently used data. Using a random-access cache allows for faster response times for data stored in the cache. According to FIG. 7, a memory controller 720 communicates with a host via a host interface 710. In some implementations, the non-volatile cache 730 may include flash memory and the non-volatile memory 740 may include magnetic memory, for example. In this scenario, servicing an erase of the flash cache before a read may have an impact on the performance of the memory device. If an erase is performed on the flash cache before a read, the performance benefit associated with the flash cache may be reduced. In this case, taking cost of a request type into consideration may increase the performance of the memory device.

Figure 8:
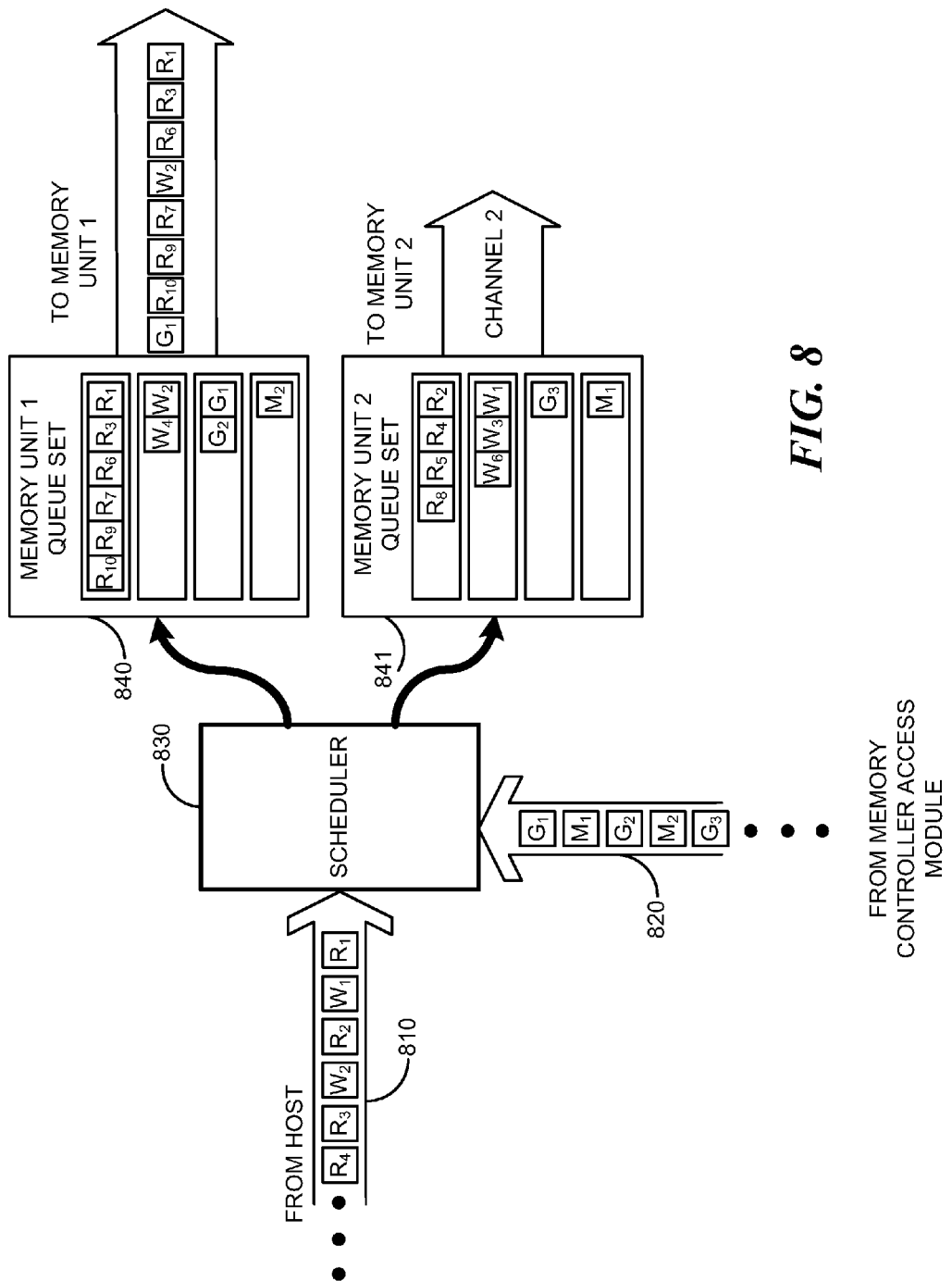
FIG. 8 illustrates an example of scheduling and servicing memory access requests according to a priority scheme according to embodiments presented herein.

An example of scheduling and servicing memory access requests is shown in FIG. 8. According to FIG. 8, read and write requests are received from the host. In this case, ten read requests ($R_1$-$R_{10}$) and five write ($W_1$-$W_5$) requests are received from the host. Each of these host-originated requests 810 is assigned to memory unit queue set 840, 841 by the scheduler 830. In this example, there are two memory unit queue sets 840, 841 where each channel is associated with one memory unit within the memory device. In other cases, there may be more or fewer memory units. Memory access requests are also generated by the controller. In the case of FIG. 8, three garbage collection requests ($G_1$-$G_3$) and two metadata requests ($M_1$-$M_2$) are generated by the controller. The controller-originated requests 820 are also assigned to a memory unit queue set 840, 841. The host-originated requests 810 and the controller-originated requests 820 are assigned to an appropriate memory unit queue set 840, 841, e.g., based on memory unit load. Each request is placed in an appropriate queue within the memory unit queue set 840, 841 based on the type of request, e.g. each host read request is placed in the host read queue within the memory unit queue set.

FIG. 8 also illustrates the order in which the requests 810, 820 are serviced for the first memory unit queue set 840. The requests 810, 820 are serviced in an order based on the priority of the requests 810, 820 and the position of each request 810, 820 within its respective queue. In the case of FIG. 8, the priority ratio between host writes and host reads is 1:3 and the priority ratio between garbage collection requests and host-originated requests is 1:7. According to this priority scheme, one host write request is serviced for every three host read requests and one garbage collection request is serviced for every 7 host-originated requests 810. The operation of the priority scheme can be observed in FIG. 8 in which $R_1$, $R_3$ and $R_6$ are serviced before $W_2$ is serviced, and seven host-originated requests 410 are serviced before one garbage collection request is serviced. In some cases, metadata requests have a relatively low priority so that 100 other requests e.g., host reads, host writes, and/or garbage collection requests are serviced before a queued metadata request is serviced.

Figure 9:
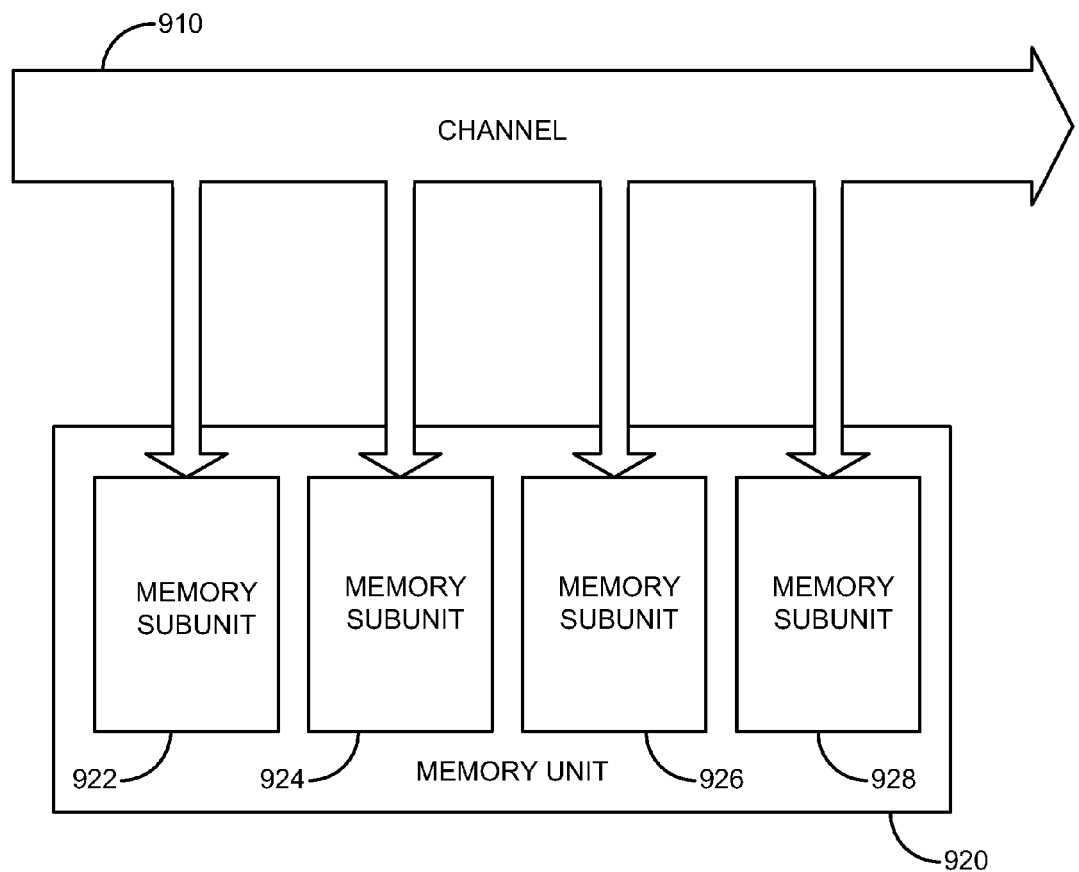
FIG. 9 is a block diagram of a memory unit and its associated channel according to some embodiments.

Turning now to FIG. 9, a channel 910 and a memory unit 920 is shown. As mentioned previously, there is one channel associated with each memory unit. A memory unit 920 may also have one or more memory subunits 922, 924, 926, 928. In some embodiments, a channel 910 that is associated with a memory unit 920 services the one or more memory subunits 922, 924, 926, 928. For example, in the case of flash memory, the memory unit may comprise a flash chip and each flash chip can include one or more memory subunits corresponding to flash die. In the case of flash memory, each die may have more than one plane, facilitating concurrent memory access requests to be serviced at the same time. Each flash die of a flash chip is accessed via the same channel 910.

In some implementations, each memory subunit 922, 924, 926, 928 is capable of servicing one request at a time. Scheduling a request to be serviced depends on the availability of idle memory subunits 922, 924, 926, 928 within the memory unit 920. In this example, a memory access request cannot be sent to a memory unit 920 if all of the memory subunits 922, 924, 926, 928 are busy servicing other requests. In this case, the next memory access request will be serviced when at least one of the memory subunits 922, 924, 926, 928 becomes idle.

Figure 10:
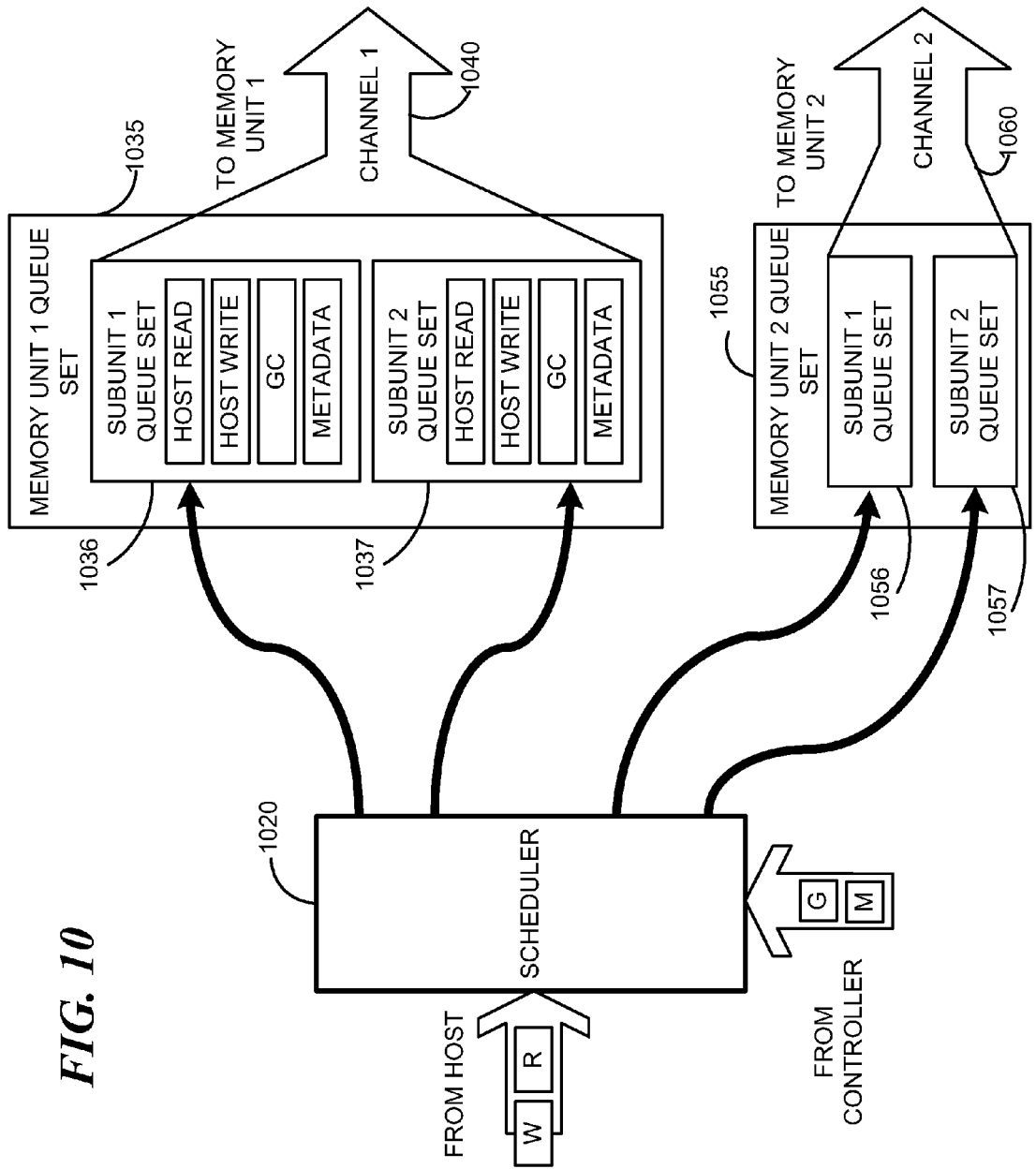
FIG. 10 illustrates a block diagram of a portion of a memory controller capable of scheduling memory access requests according to various implementations described herein.

Another example of scheduling and servicing memory access requests is shown in FIG. 10. According to FIG. 10, read requests (R) and write requests (W) are received from the host. Memory access requests are also generated by the controller including garbage collection requests (G) and metadata requests (M). In the case of FIG. 10, each host-originated request and each controller-originated request is assigned to a memory subunit queue set 1036, 1037, 1056, 1057, e.g. a die queue. In some cases, the memory access requests may be assigned to the memory subunit queue set 1036, 1037, 1056, 1057 associated with a memory subunit based on the load of the memory subunit. Each memory unit may contain one or more memory subunits. In the case of FIG. 10, there are two channels and two subunits associated with each channel. In some embodiments there may be more or fewer channels and more or fewer memory subunits. For some types of requests, each request may also be assigned to a particular subunit queue set 1036, 1037, 1056, 1057 based on the recent use of a memory subunit to prevent more frequent use of a particular memory subunit over other memory subunits in the memory unit. Each request is placed in an appropriate queue within the memory subunit queue set 1036, 1037, 1056, 1057 based on the type of request, e.g. each host read request is placed in the host read queue within the subunit queue set. When a request is ready to be serviced, the request is sent to the appropriate memory subunit via a channel 1040, 1060. For example, a request may be ready to be serviced if 1) the request is at the head of a queue on a subunit queue set, 2) the request is the next request to be serviced according to any active priority scheme, and 3) the memory subunit that the request is assigned to is idle.

Figure 11A:
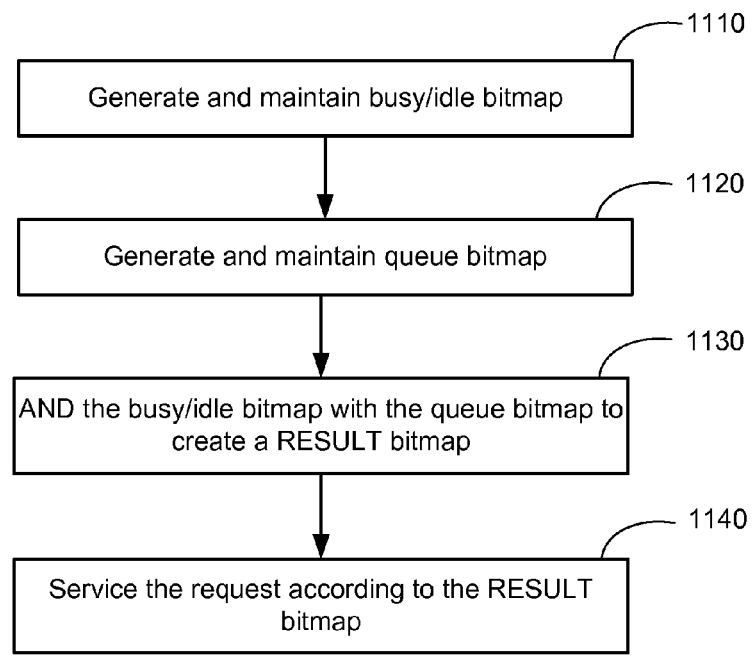
FIGS. 11A and 11B describe a process for servicing memory access requests according to embodiments described herein.
Figure 11B:
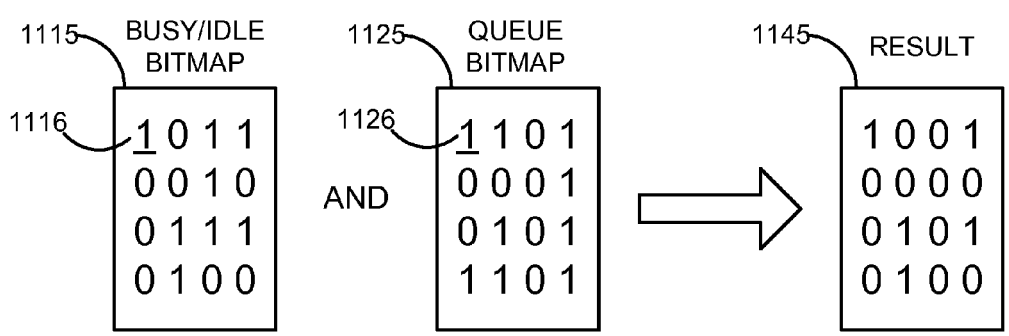

The memory controller may use one or more bitmaps to service the memory access requests in a way that avoids conflicts. In some cases, the bitmaps may be associated with memory units and in some cases the bitmaps may be associated with memory subunits. As an example, one bitmap may be associated with the busy/idle status of each memory subunit with in a memory unit. After a memory access request is scheduled to a memory subunit queue set and is the next request to be scheduled to be serviced within a subunit queue set, the controller determines if the memory subunit associated with the memory subunit queue set is idle. FIGS. 11A and 11B describe a process for servicing memory access requests according to embodiments described herein. According to FIG. 11A, a busy/idle bitmap 1115 that indicates busy/idle memory subunits is generated and maintained 1110. Turning to FIG. 11B, the busy/idle bitmap 1115 comprises a map representing each of the memory subunits within a memory unit. In some cases, the busy/idle bitmap 1115 may be associated with memory units or memory subunits in more than one memory unit. In the example of FIG. 11B, the busy/idle bitmap 1115 contains at least one position. Each busy/idle position is associated with a particular memory subunit and contains either a "1" or a "0." In the example of FIG. 11B, each "1" on the busy/idle bitmap 1115 indicates that the memory subunit associated with that bitmap position is currently idle. Each "0" on the busy/idle bitmap 1115 represents that the memory subunit associated with that bitmap position is currently busy.

A queue bitmap 1125 is also generated and maintained 1120. The queue bitmap 1125 indicates the queue sets that have requests waiting to be serviced. In the example of FIG. 11B, the queue bitmap 1125 has the same number of positions as the busy/idle bitmap. Each memory subunit queue set is associated with one position on the queue bitmap 1125. Each position on the busy/idle bitmap has a corresponding queue set position on the queue bitmap. For example, position one on the queue bitmap 1116 represents the memory subunit queue set for the memory subunit associated with position one of the busy/idle queue set 1126. The "1s" on the queue bitmap 1125 indicate that a memory access request is in queue to be serviced to the memory subunit associated with the positions of the "1s." The "0s" on the queue bitmap 1125 indicate that no memory access requests are waiting to be scheduled to the memory subunits associated with the positions indicated by the "0s." The busy/idle bitmap 1115 and the queue bitmap 1125 are ANDed together 1130 to form a RESULT bitmap 1145. Each "1" on the RESULT bitmap 1145 indicates that the memory subunit associated with that position is idle and that the memory subunit has a request that is waiting to be scheduled to the memory subunit. The requests in memory subunit queue sets associated with each "1" on the RESULT bitmap 1145 are able to be scheduled to the corresponding idle memory subunit. Each "0" on the RESULT bitmap 1145 indicates that 1) the memory subunit associated with that position is busy, 2) there are no requests in a memory subunit queue set waiting to be scheduled to the associated memory subunit, or 3) both 1 and 2. The memory access requests are serviced 1140 according to the RESULT bitmap 1145. Using bitmaps in this way may eliminate any ordering within queues or any traversal of queues to choose a request allowing for more efficient resource management.

It is to be understood that this detailed description is illustrative only, and various additions and/or modifications may be made to these embodiments, especially in matters of structure and arrangements of parts. Accordingly, the scope of the present disclosure should not be limited by the particular embodiments described above, but should be defined by the claims set forth below and equivalents thereof.

What is claimed is:

1. A method comprising:
receiving first memory access requests generated by a memory controller;
receiving second memory access requests from a host terminal;
sending the first and second memory access requests to two or more memory units, wherein each of the memory units are associated with a dedicated queue set, each dedicated queue set comprising first and second queues into which the respective first and second memory access requests are placed; and
sending the first and second memory access requests to the memory units according to a ratio of the first and second memory access requests, the ratio defining relative priorities of the first and second queues.

2. The method of claim 1, wherein the first queues comprise two or more first queues each respectively associated with a type of memory access request generated by the memory controller, wherein the types of memory access requests include at least a garbage collection request and a metadata request, wherein the two or more first queues are associated with different priorities.

3. The method of claim 1, wherein each memory unit comprises one or more memory subunits.

4. The method of claim 1, wherein the second memory access requests are assigned a higher priority than the first memory access requests.

5. The method of claim 1, wherein the second memory access requests are assigned a lower priority than the first memory access requests.

6. The method of claim 1, wherein each memory unit comprises multiple memory subunits and each queue set comprises multiple queue sets each associated with a different one of the memory subunits, each of the queue sets having different ones of the first and second queues.

7. The method of claim 6, wherein sending the first and second memory access requests includes determining that a memory subunit is idle before sending.

8. The method of claim 6, wherein sending the first and second memory access requests comprises sending according to a bitmap of idle memory subunits and a bitmap of memory access requests in the memory subunit queues.

9. The method of claim 1, wherein each of the second queues comprise two or more second queues each respectively associated with a type of memory access received from the host, wherein the types of memory access requests include at least a read request and a write request, wherein the two or more second queues are associated with different priorities.

10. The method of claim 1, further comprising changing the ratio based on a load of the first and second memory access requests.

11. The method of claim 1, further comprising assigning a number of tokens to the first and second queues according to the ratio, wherein sending the first and second memory access requests to the memory units involves decrementing respective tokens, wherein requests are serviced based on a number of remaining tokens associated with the first and second queues.

12. A method of operating a flash memory controller, the method comprising:
generating first memory access requests by the flash memory controller;
receiving second memory access requests from a host;
sending the first and second memory access requests to a plurality of queue sets each associated with a different memory die of a memory chip having multiple memory dies, each of the queue sets comprising first and second queues into which the respective first and second memory accesses are placed; and
sending the first and second memory access requests to the associated memory die according to a ratio of first requests to second requests, the ratio defining relative priorities of the first and second queues.

13. The method of claim 12, wherein the second memory access requests are assigned a higher priority than the first memory access requests.

14. The method of claim 12, wherein the second memory access requests are assigned a lower priority than the first memory access requests.

15. The method of claim 12, wherein the first memory access requests include one or both of garbage collection and metadata requests.

16. The method of claim 12, further comprising changing the ratio based on a load of the first and second memory access requests.

17. A memory controller, comprising:
a host interface configured to receive second memory access requests from a host terminal;
memory maintenance circuitry configured to generate first memory access requests;
a scheduler configured to:
send the first and second memory access requests to one of a plurality of queue sets, each queue set associated with a channel that allows the memory controller to access a memory device, each queue set comprising first and second queues into which the first and second memory access requests are placed; and
a memory interface coupled through one or more channels to the memory device, the memory interface configured to send each of the first and second memory access requests from the memory controller to the memory device, wherein the scheduler causes the memory interface to send the first and second memory access requests to the memory device according to a ratio of the first requests to the second requests, the ratio defining relative priorities of the first and second queues.

18. The memory controller of claim 17, wherein each memory device comprises one or more memory subunits.

19. The memory controller of claim 18, wherein each memory subunit is a flash die.

20. The memory controller of claim 19, wherein each die is associated with a set of die queues.

* * * * *